(12) United States Patent
Sugimoto et al.

(10) Patent No.: US 7,564,508 B2
(45) Date of Patent: Jul. 21, 2009

(54) LIGHT PATH SHIFT DEVICE AND IMAGE DISPLAY DEVICE

(75) Inventors: Hiroyuki Sugimoto, Kanagawa (JP); Toshiaki Tokita, Kanagawa (JP); Kazuhiro Fujita, Tokyo (JP); Toshiharu Murai, Kanagawa (JP); Yasuyuki Takiguchi, Kanagawa (JP); Atsushi Takaura, Tokyo (JP); Kazuya Miyagaki, Kanagawa (JP); Takanobu Osaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 11/374,317

(22) Filed: Mar. 14, 2006

(65) Prior Publication Data

US 2006/0209295 A1    Sep. 21, 2006

(30) Foreign Application Priority Data

Mar. 16, 2005  (JP) .............................. 2005-076107

(51) Int. Cl.
| | |
|---|---|
| G02F 1/13 | (2006.01) |
| G02F 1/133 | (2006.01) |
| G02F 1/135 | (2006.01) |
| G02F 1/1335 | (2006.01) |
| G02F 1/1347 | (2006.01) |
| G02F 1/1333 | (2006.01) |
| G02F 1/1337 | (2006.01) |
| G02F 1/141 | (2006.01) |
| G02F 1/1343 | (2006.01) |
| C09K 19/02 | (2006.01) |

(52) U.S. Cl. .............................. 349/30; 349/1; 349/19; 349/24; 349/25; 349/61; 349/74; 349/75; 349/76; 349/84; 349/122; 349/123; 349/132; 349/133; 349/139; 349/171; 349/172; 349/184

(58) Field of Classification Search .................. 349/1, 349/19, 24, 25, 30, 61, 74–76, 84, 122, 123, 349/132, 133, 139, 171, 172, 184
See application file for complete search history.

(56) References Cited

U.S. PATENT DOCUMENTS

| 4,726,660 A | * | 2/1988 | Rushford .................... 349/175 |
|---|---|---|---|
| 2004/0016110 A1 | * | 1/2004 | Kawase ....................... 29/612 |
| 2004/0036829 A1 | * | 2/2004 | Sugimoto et al. ........... 349/141 |
| 2006/0209295 A1 | | 9/2006 | Sugimoto et al. |

FOREIGN PATENT DOCUMENTS

| JP | 3331575 | 7/2002 |
|---|---|---|
| JP | 2002-328402 | 11/2002 |

OTHER PUBLICATIONS

U.S. Appl. No. 11/684,742, filed Mar. 12, 2007, Hirano, et al.

* cited by examiner

*Primary Examiner*—Frank G Font
*Assistant Examiner*—Jerry Blevins
(74) *Attorney, Agent, or Firm*—Oblon, Spivak, McClelland, Maier & Neustadt, P.C.

(57) ABSTRACT

A light path shift device is disclosed that is able to divide an effective region of a light path and drive the divided regions independently. The light path shift device includes a liquid crystal layer held between at least two opposite transparent substrates, the liquid crystal layer being homeotropically aligned and being able to form a chiral smectic C phase; and plural electrodes for applying an electric field in the liquid crystal layer in a horizontal direction. An effective region of the liquid crystal layer through which a light path passes is divided into plural sub-regions, plural light path shift elements with the electrodes formed thereon are stacked only at positions corresponding to the sub-regions, and are arranged so that boundary lines of the sub-regions are in agreement when being viewed along the direction of light propagation.

7 Claims, 12 Drawing Sheets dielectric layer 116
112
115 transparent line electrode
118

118
115 transparent line electrode
117 resistor
105 boundary line
116 dielectric layer

LIGHT PATH SHIFT DEVICE AND IMAGE DISPLAY DEVICE

BACKGROUND OF THE INVENTION

1. Field of the Invention

The present invention relates to a light path shift device, which is used in a display device and an image input device, for performing light path control with a light path shift unit for shifting a light path, and an image display device using the light path shift device.

2. Description of the Related Art

In the following, a light path shift unit indicates an optical element which deflects a light path of light based on an external electric signal, namely, it is an optical element which shifts the emitting light relative to the incident light in parallel, or rotates the emitting light at a certain angle, or combines these two operations to change the light path. In addition, the magnitude of the light path shift in the parallel shift is referred to as "shift distance", and the magnitude of the rotation of the light path in the rotational shift is referred to as "rotational angle". Additionally, it is assumed that a light path shift device includes such a light path shift unit and is able to shift the path of the light.

Further, in the following, it is assumed that a "pixel shift device" includes an image display unit having plural two-dimensionally arranged pixels each able to control light passing therethrough according to image information, a light source for illuminating the image display unit, an optical member for observing an image pattern displayed on the image display unit, and an optical deflection unit for deflecting a light path between the optical member and the image display unit for each of plural sub fields obtained by dividing an image field in a time division manner. In the pixel shift device, the optical deflection unit deflects the light path for each of the sub fields, such that image patterns at shifted positions, which correspond to the shift of the light path of each of the sub fields, are displayed on the image display unit, and as a result, it appears that the number of pixels is doubled on the image display unit.

In the related art, by applying a transverse voltage on a homeotropically-aligned Chiral Smectic C liquid crystal to change a tilt angle of the liquid crystal molecules, and along with that, due to a change of the birefringence, the light path of the incident light can be shifted.

In addition, in a pixel shift unit using the homeotropically-aligned Chiral Smectic C liquid crystal, by a voltage application unit (a line electrode) and a transparent resistor, a transverse voltage is applied uniformly.

When using the pixel shift unit in a display device, the pixel shift unit is arranged between an image display unit, such as a liquid crystal image display device, and an optical system for magnifying the image from the image display unit. When the pixel shift unit shifts the light path by half pixel pitch in totally four directions, sub-images are created by extracting contents from an image to be displayed on one screen every two pixels in the vertical direction and the horizontal direction, and in response to the light path shift operation of the pixel shift unit, four sub-images are sequentially displayed on the image display unit. In this way, with an image display unit having relatively a small number of pixels, it is possible to display images of high resolution. Namely, it is possible to display images each including the number of pixels of the display unit multiplied by the shift level numbers.

FIG. 14 is a schematic view of a configuration of a magnification display device using a light path shift unit.

Shown in FIG. 14 are a light source 81, fly-eye lens arrays 82, 83, a condensing lens 84, a projection lens 85, a screen 66, a control circuit of the liquid crystal panel 88, a light path shift unit 89, a control circuit 90 of the light path shift unit 89, a polarized beam splitter 91, and a reflection-type liquid panel 92 serving as the image display unit.

The fly-eye lens arrays 82, 83 are integrator optical systems for homogenizing the light from the light source 81. The condensing lens 84 condenses the light onto the image display unit 92 for illumination. The polarized beam splitter 91 splits the illumination light and the imaging light.

The light emitted from the light source 81 is homogenized by the fly-eye lens arrays 82, 83, which serve as the integrator optical systems. The condensing lens 84 converts the incident light into nearly parallel light to illuminate the liquid crystal panel 92. The light path shift unit 89 shifts the imaging light by a preset distance along the pixel arrangement direction. The light is magnified by the projection lens 85, and is projected onto the screen 66.

It is preferable that the shifted distance be one part of integral multiple divisions of the pixel pitch. For example, when it is desired to double the pixel numbers along the pixel arrangement direction, the shifted distance may be half of the pixel pitch; when it is desired to increase the pixel numbers four-fold along the pixel arrangement direction, the shifted distance may be a quarter of the pixel pitch.

In either case, plural sub fields are created by dividing an image field in a time division manner according to the shift level number, the pixel shift unit operates for each sub field, and images are displayed on the display unit at positions corresponding to the states of the pixel shift unit. In this way, it is possible to apparently display images of high resolution.

In the above, the reflection-type liquid panel 92 as shown in FIG. 14 is used as an example for illustration; certainly, a transmission-type liquid panel, a micro mirror, or other two-dimensionally arranged optical elements can also be used as the display unit.

FIG. 15 is a schematic view of a basic configuration of the light path shift unit illustrating light paths of the light path shift unit.

Shown in FIG. 15 are a light path shift unit 1, transparent substrates 2, 3, an alignment film 4, and a ferroelectric liquid crystal 5 including a chiral smectic C phase.

The alignment film 4 is formed on an inner surface of at least one of the transparent substrates 2, 3, and the ferroelectric liquid crystal 5 including a chiral smectic C phase is supplied between the alignment film 4 and the other transparent substrate. In the smectic liquid crystal, liquid crystal molecules are arranged in layers along the long axis direction. When the normal direction of the liquid crystal molecule layer is in agreement with the long axis direction of the liquid crystal molecules, the liquid crystal in this state is referred to as "smectic A phase"; when the normal direction of the liquid crystal molecule layer is not in agreement with the long axis direction of the liquid crystal molecules, the liquid crystal in this state is referred to as "smectic C phase". In the smectic C phase, when the external electric field is not in action, the direction of the liquid crystal director of each liquid crystal molecule layer is spiraled. The chiral smectic C phase has a molecular structure including asymmetric carbon atoms; thereby, spontaneous polarization occurs. Because the spontaneous polarization occurs, the liquid crystal molecules are rearranged in the direction determined by the spontaneous polarization Ps and the external electric field E, and in this way, optical properties of the liquid crystal molecules are controlled.

The chiral smectic C phase ferroelectric liquid crystal 5 constitutes a homeotropic alignment, namely, due to the alignment film 4, the chiral smectic C phase ferroelectric liquid crystal molecules are aligned in a molecular spiral rotation manner with the rotational axis of the molecular spiral rotation being perpendicular to the substrate. In the light path shift unit 1, corresponding to the light deflection direction, a not-illustrated electrode pair are arranged on the front side and the back side of the paper, and this electrode pair is arranged so that the electric field vector is nearly perpendicular to the liquid crystal rotational axis of the light path shift unit 1.

In addition, compared to smectic A phase or nematic liquid crystal, the chiral smectic C phase liquid crystal 5 is capable of response at very high speed, and is capable of switching on the order of sub ms. Especially, since the direction of the liquid crystal director is uniquely defined relative to the electric field, it is easy to control the direction of the liquid crystal director compared to smectic A phase liquid crystal.

FIG. 16 is a schematic view illustrating the liquid crystal alignment in the light path shift unit shown in FIG. 15.

In FIG. 16, the electric field is applied in a direction perpendicular to the paper. Liquid crystal directors 8 are shown in FIG. 16. A Cartesian coordinate system is established as shown in FIG. 16, and in this coordinate system, in an XZ cross section in the liquid crystal, the liquid crystal directors 8 are distributed as shown in FIG. 16.

FIG. 17 is a longitudinal sectional view of the portion in FIG. 16.

In FIG. 17, $\theta$ represents a tilt angle of the liquid crystal director relative to the rotational axis of the liquid crystal. In the following, it is simply referred to as a "tilt angle". It is assumed that the spontaneous polarization Ps of the liquid crystal is positive, and an electric field E is applied along the +Y direction (pointing to the paper). So, the liquid crystal director is in the XZ plane since the rotational axis of the liquid crystal is nearly perpendicular to the substrate.

It is assumed that the refractive index in the long axis direction of the liquid crystal molecules is denoted as "ne", and the refractive index in the short axis direction of the liquid crystal molecules is denoted as "no". Then, if the incident light is a linearly-polarized light beam having a polarization plane in the direction of the Y-axis, and the incident light propagates in the +X axis direction, the incident light acts as ordinary light in the liquid crystal, and is refracted with the refractive index of no; but the light beam perpendicular to the incident plane propagates directly in the direction "a" as shown in FIG. 17, namely, the light beam perpendicular to the incident plane is not refracted.

On the other hand, when the incident light is a linearly-polarized light beam having a polarization plane in the direction of the Z-axis, the refractive index of the incident light is determined from the direction of the liquid crystal director, and from no and ne. Specifically, the refractive index of the incident light is determined from the relationship with the direction of the light passing through the center of a refractive ellipsoid with principal axes having refractive indexes no and ne, respectively. The details of determining the refractive indexes of the incident light are omitted.

The incident light perpendicular to the incident plane is deflected according to no, ne, and the tilt angle $\theta$ of the liquid crystal director in a direction "b" as shown in FIG. 17, that is, the incident light is shifted. If the liquid crystal thickness (or referred to as "gap") is represented by d, it is known that the shift distance S can be expressed by the following equation (1).

$$S=\{[(1/no)2-(1/ne)2] \sin(2\theta) \times d\}/\{2[(1/ne)2 \sin(2\theta)+(1/no)2 \sin(2\theta)]\} \quad (1)$$

When the electric field is inverted, the liquid crystal director has a linear symmetric arrangement with the X axis as a center, as shown by the dot-dashed line, and the linearly-polarized light beam having a polarization plane in the direction of the Z-axis propagates in the direction "b", as shown in FIG. 17.

Hence, by controlling the direction of the electric field, the linearly-polarized light beam can be shifted to positions "b" and "b'", corresponding to a shift distance equaling 2S.

If the obtainable light deflection is calculated relative the typical property parameters of the liquid crystal (no=1.6, ne=1.8), it is found that when the tilt angle $\theta$ of the liquid crystal director is 22.5°, in order to obtain a shift distance 2S=5 µm, it is found that the thickness of the liquid crystal can be 32 µm.

In addition, in a homeotropic alignment ferroelectric liquid crystal, it was reported that a response speed of 0.1 ms was obtained with respect to an electric field of 700 V/cm. For example, please refer to "Ozaki et al., J. J. Appl. Physics, Vol. 30, No. 9B, pp. 2366-2368 (1991)". That is, a response speed of the order of sub ms is obtainable.

Generally, an image display device such as a liquid crystal panel has an interconnection electrode structure so that line electrodes and column electrodes are arranged in a matrix shape.

FIG. 18 is a schematic plan view illustrating a liquid crystal panel serving as an image display device.

Shown in FIG. 18 are a matrix electrode 924, a line driver 922, and a column driver 923. At the cross portions of the line electrodes and the column electrodes, active elements including transistors are provided, respectively, and by switching the active elements, voltages are applied on the liquid crystal. There are various kinds of methods of displaying images on the liquid crystal panel; for example, generally, it is known that are a "one time rewrite method" and "scanning method". In the one time rewrite method, the whole screen is rewritten at one time; whereas in the scanning method, the displayed image is rewritten one line by one line sequentially from the top of the screen (line sequential manner).

In the one time rewrite method, frequently, the grade level is controlled digitally, and in this case, the light path shift unit operates in synchronization with the rewriting of the screen; thereby, the method is capable of high definition display.

In the line sequential method, frequently, the grade level is controlled in an analog manner. For example, one screen is rewritten while scanning at a frequency of a few tens of Hz to 300 Hz.

In the one time rewrite method, the light path shift unit may operate at a lump, and it can be realized by using a very simple mechanism.

For example, Japanese Laid Open Patent Application No. 7-64048 (below, referred to as reference 1) discloses a technique in this field.

In the one time rewrite method, the digital grade level is performed by using a ferroelectric liquid crystal, however, the digital grade level control requires a very high speed to transfer data to the image display device. This is a problem especially when using a light path shift technique because this technique needs to further divide frames and to operate at a high frame rate, and the limit on the transfer speed further causes a limit of the grade level number and the number of the displayed pixels.

On the other hand, when writing image data of analog grades by scanning, although there are few limits to the transfer speed, if the light path units are operated at the same time, one image corresponding to one sub-field is divided into portions at different shifted positions, and is displayed with the divisions being at different positions. This is because while the image display device operates in a scanning manner, the light path shift unit of the related art shifts at one time. Further, although the response of the light path shift using the chiral smectic C phase liquid crystal is high, the delay caused by the light path shift is not negligible compared to the time required for one field of one image. FIG. 19 explains this problem.

FIG. 19 us a diagram illustrating a relationship between an electrode scanning position and a shift distance.

As shown in FIG. 19, while the graph representing the shift distance has a trapezoidal shape, the inclined side of the trapezoid is attributed to a response delay relative to level change of the input signal.

As shown in FIG. 19, a sub-field, which originally corresponds to image data to be displayed at one position, is divided into a part corresponding to timing before the operation of the light path shift unit and a part corresponding to timing after the operation of the light path shift unit.

Specifically, up to time t1, the image at lines from a1 to b1 is displayed by the light along a light path b shifted by a distance S; from the time t1 to the time t2, the image at lines from b1 to c1 is displayed by the light along a light path b and sequentially sifted to a light path b'. In other words, the image from a shift distance S toward a shift distance −S is partially moved; from the time t2 to the time t3, the image at lines from a1 to c1, and the image of the subsequent scanning up to a line d1 are displayed by the light along a light path b' shifted by a distance −S; further, from the time t3 to the time t4, the portion of the image at lines from b1 to d1 is moved from a light path b sequentially shifted to a light path b; at last, after the time t4, the portion of the image at lines from c1 to d1 is displayed by the light along the light path b shifted by a distance S. Namely, the sub-field A is divided into three parts, and they are displayed at two shifted positions.

Next, for the sub-field B, up to time t3, the portion of the image at lines from a2 to b2 is displayed by the light along the same light path b', part of the sub-field A and part of the sub-field B are combined and displayed at the same shifted position. This causes partial movement of an image and degradation of image resolution.

In addition, as disclosed in reference 1, a ferroelectric liquid crystal is used as a polarization control unit, and at the exit side, a birefringence medium having an inclined crystal axis is arranged. The polarization plane of the polarized light incident on the birefringence medium is modulated in an inclined direction and the crystal axis or a direction perpendicular to the crystal axis, thereby performing light path shift. In the method disclosed in reference 1, relative to the above-mentioned scanning type display unit, an electrode of a polarization direction control panel of the light path shift unit is divided into plural regions perpendicular to the scanning direction; one pair of the electrodes are selected in synchronization with the scanning of the display device and a voltage is applied on the pair of the electrodes. By changing the pair of the electrodes, the light path shift unit is partially operated.

However, for the vertically aligned ferroelectric liquid crystal, there is a basic difference in operating method, namely, the liquid crystal is operated in a direction parallel to the substrate. The method disclosed in reference 1 is not applicable.

SUMMARY OF THE INVENTION

The present invention may solve one or more problems of the related art.

A preferred embodiment of the present invention may provide a light path shift device able to divide an effective region of a light path and drive the divided regions independently, and an image display device using the light path shift device.

According to the present invention, there is provided a light path shift device, comprising: a liquid crystal layer that is held between at least two opposite transparent substrates, said liquid crystal layer being homeotropically aligned and being able to form a chiral smectic C phase; and a plurality of electrodes that apply an electric field in the liquid crystal layer in a horizontal direction, wherein an effective region of the liquid crystal layer through which a light path passes is divided into a plurality of sub-regions, a plurality of light path shift elements with the electrodes formed thereon are stacked only at positions corresponding to the sub-regions, and are arranged so that boundary lines of the sub-regions are in agreement when viewed along the direction of light propagation.

According to the present invention, the effective region through which a light path passes is divided into plural sub-regions, plural light path shift elements with the electrodes formed thereon are stacked only at positions corresponding to the sub-regions, and are arranged so that boundary lines of the sub-regions are in agreement when viewing along the direction of light propagation. Hence, it is possible to set the light path shift direction independently in different sub-regions, and as a result, it is possible to independently drive the divided effective region of the light path.

These and other objects, features, and advantages of the present invention will become more apparent from the following detailed description of preferred embodiments given with reference to the accompanying drawings.

DESCRIPTION OF THE PREFERRED EMBODIMENTS

Figure 1:
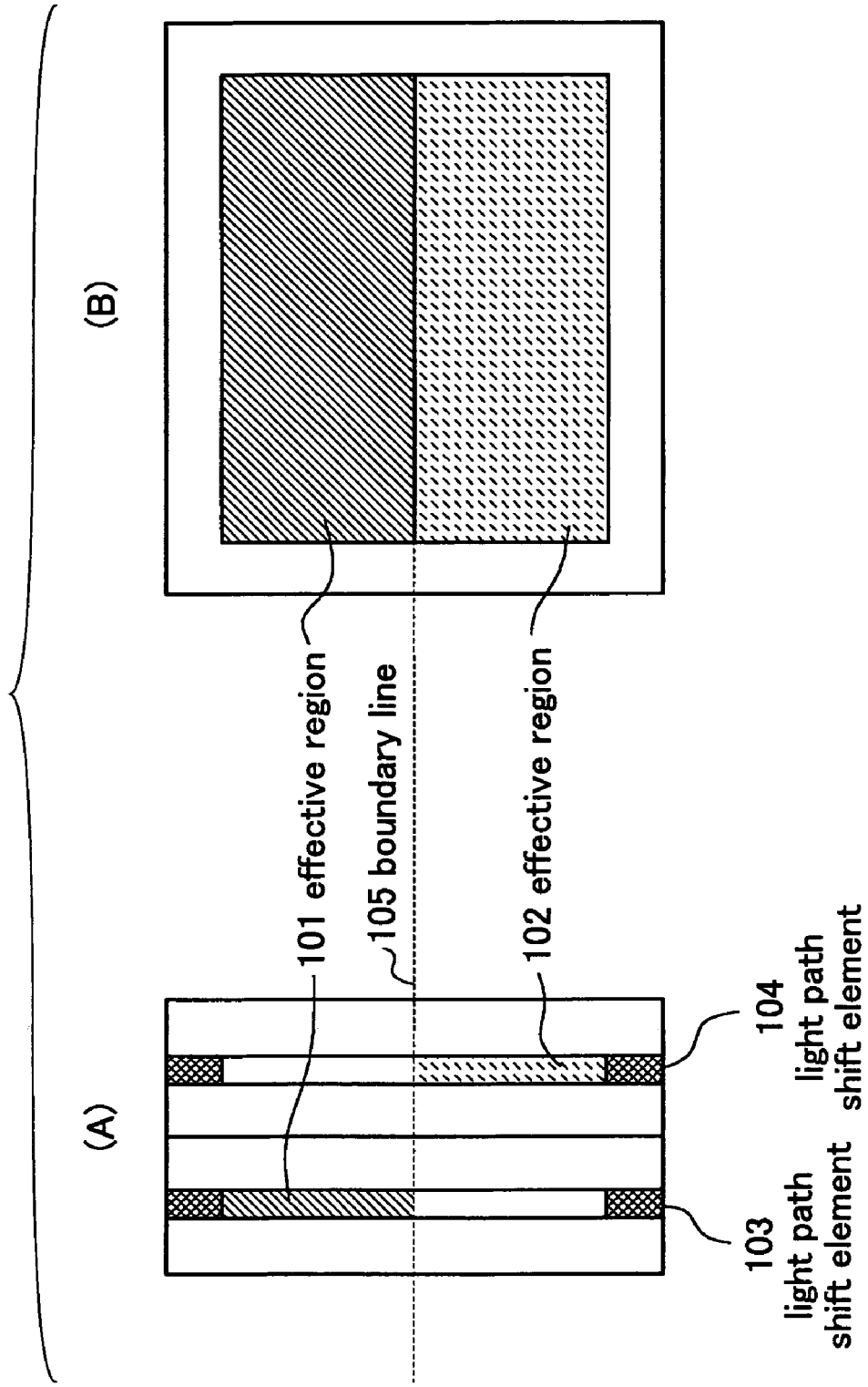
FIG. 1A and FIG. 1B are a side cross-sectional view and a front view of a light path shift device according to a first embodiment of the present invention.

Below, preferred embodiments of the present invention are explained with reference to the accompanying drawings.

First Embodiment

FIG. 1A and FIG. 1B are a side cross-sectional view and a front view of a light path shift device according to a first embodiment of the present invention.

As shown in FIG. 1A and FIG. 1B, in the light path shift device includes two light path shift elements 103 and 104 which are stacked together and are located in two different effective regions 101 and 102 separated by a boundary line 105. The first light path shift element 103 is configured such that an electric field can be applied in the vertical direction in the upper portion in FIG. 1A and FIG. 1B through not-illustrated electrodes and electric field application means. In FIG. 1B, first light path shift element 103 can shift the light path in the horizontal direction.

The second light path shift element 104 is configured such that an electric field can be applied in the vertical direction in the lower portion in FIG. 1A and FIG. 1B through not-illustrated electrodes and electric field application means. In FIG. 1B, the second light path shift element 104 can shift the light path in the horizontal direction.

Below, the basic configuration of the light path shift element is explained. A pair of transparent substrates are arranged to face each other. The transparent substrates may be formed from glass, silica, plastic or others. Preferably, the transparent substrates are formed from transparent materials with birefringence. The thickness of the transparent substrates may be from a few tens μm to a several mm. A perpendicular alignment film is formed on an inner surface of each of the transparent substrates. For example, an alignment film may be formed from any materials able to produce perpendicular alignment of the liquid crystal molecules relative to the substrate surface (namely, homeotropic alignment), for example, a perpendicular alignment agent used in a liquid crystal display, a silane coupling agent, a $SiO_2$ evaporation film.

Here, the term "perpendicular alignment" (homeotropic alignment) includes not only the alignment state in which the liquid crystal molecules are aligned perpendicular to the substrate surface, but also includes the alignment state in which the liquid crystal molecules are tilted by several tens degrees. The thickness of the liquid crystal layer is determined by the tilt angle of the liquid crystal molecules and the refractive index of the liquid crystal.

The interval between the transparent substrates is defined by disposing spacers, and a liquid crystal layer and electrodes are arranged between the transparent substrates. Each spacer may have a thickness from a few tens μm to a several mm. For example, the spacer may be a sheet member or a particle having a similar diameter. It is preferable that the spacers be arranged outside the effective region of each light path shift element.

Within the effective region of each light path shift element, the electrodes for applying an electric field in the horizontal direction in the effective region may be formed from aluminum, copper, chrome, or other metal sheets, or the above-mentioned metal films formed on the substrate surface. However, it is preferable to use the transparent electrode material so as to arrange the spacers in the whole light path inside the device.

For example, the liquid crystal layer may be formed from any liquid crystal able to form a chiral smectic C phase. The liquid crystal layer may be injected into the whole space between the glass substrates; alternatively, the space between the glass substrates may be filled with the transparent materials except for the effective region of the light path shift element, and the liquid crystal layer may be formed only in the effective region on which an electric field is applied.

In the present embodiment, as an example, it is assumed that the liquid crystal layer is a ferroelectric liquid crystal, and acts as a light deflection element. Certainly, the liquid crystal layer may also be formed from anti-ferroelectric liquid crystal.

Figure 2:
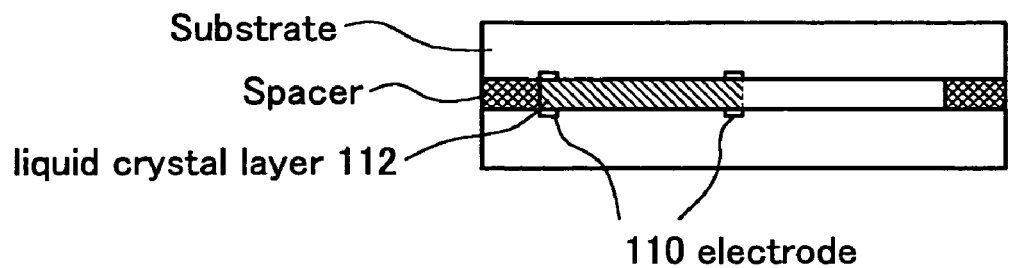
FIG. 2 is a side cross-sectional view illustrating an electrode used in the light path shift device of the first embodiment.

FIG. 2 is a side cross-sectional view illustrating an electrode used in the light path shift device of the first embodiment.

As shown in FIG. 2, two electrodes 110 are formed at the corresponding ends of the effective region 101, and a voltage is applied between the two electrodes 110 to apply an electric field in the horizontal direction in the liquid crystal layer 112 in the effective region 101, thus to shift the light path.

If plural light path shift elements, which can be driven independently by the electric field, are stacked together with the boundary lines 105 of the effective regions in different layers in agreement when viewed along the direction of light propagation, an integrated light path shift device can be formed which has different regions causing light shift in different directions.

Here, it is described that the light path shift device is divided into two effective regions; certainly, the light path shift device may be divided into N effective regions, with N being any integer number.

Figure 3:
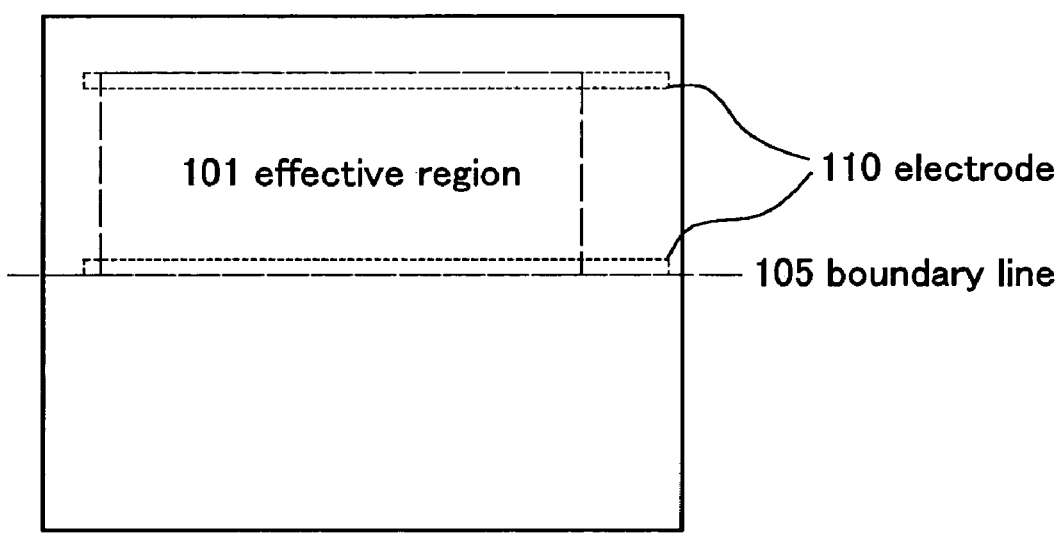
FIG. 3 is a front view illustrating an arrangement of the electrode in the light path shift device of the first embodiment.

FIG. 3 is a front view illustrating an arrangement of the electrode in the light path shift device of the present first embodiment.

Similar to FIG. 2, the two electrodes 110 are formed at the corresponding ends of the effective region 101, and when a voltage is applied between the two electrodes 110, the liquid crystal layer 112 in the effective region 101 shifts the light path.

In FIG. 1, it is illustrated that the light path shift elements 103 and 104 are stacked together. It should be noted that the light path shift device may be configured in other ways. For example, two substrates between two liquid crystal layers are made integral, the transparent line electrodes or the dielectric layer can be formed on the two sides of the integral substrate, and this structure may be used as an intermediate substrate, thus obtaining a light path shift device including three substrates having two light path shift layers.

According to the present embodiment, it is possible to form plural regions having different light path shift directions, and it is possible to divide the effective region of the light path and independently drive the divided effective regions.

Second Embodiment

When arranging electrodes only at two ends of the effective region, if the width of the effective region is large, namely, if the interval between the electrodes is large, sometimes, the electric field cannot be applied uniformly.

To solve this problem, in the present embodiment, plural transparent line electrodes are provided in parallel in the effective region.

Figure 4:
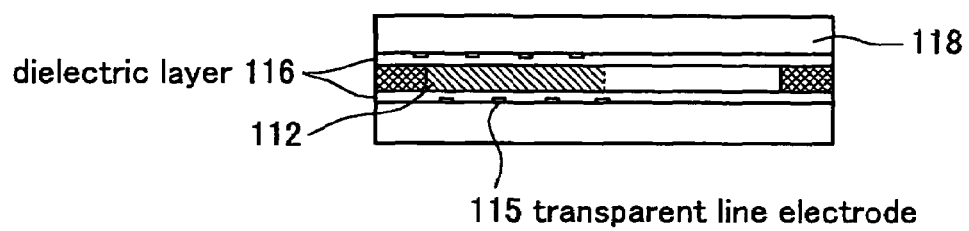
FIG. 4 is a side cross-sectional view illustrating the transparent line electrodes 115 in a light path shift device according to a second embodiment of the present invention.

FIG. 4 is a side cross-sectional view illustrating the transparent line electrodes 115 in a light path shift device according to a second embodiment of the present invention.

As shown in FIG. 4, transparent line electrodes 115 are provided parallel to each other in the effective region, and a dielectric layer 116 is formed between the plane in which the transparent line electrodes 115 are arranged and the liquid crystal layer 112.

Figure 5:
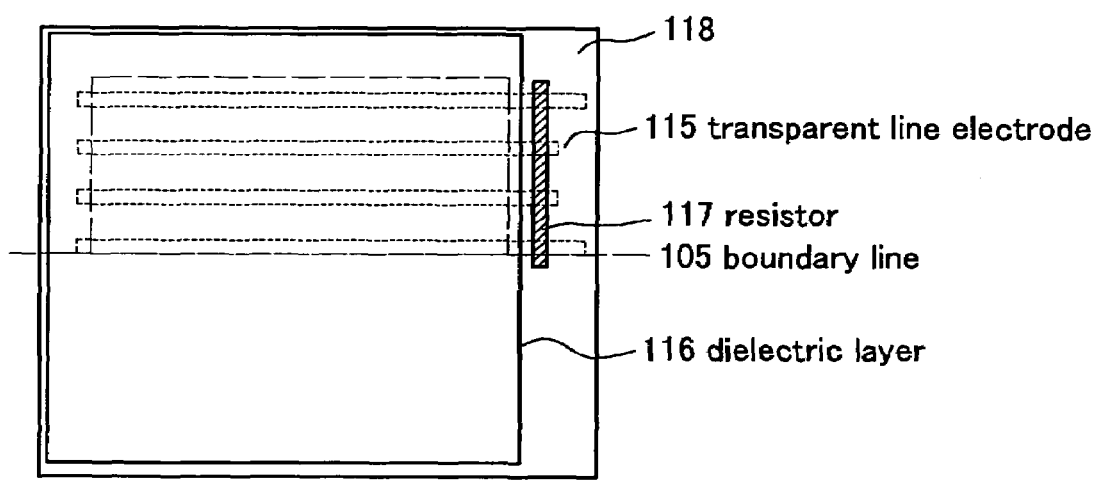
FIG. 5 is a front view illustrating an arrangement of the transparent line electrodes 115 and the dielectric layer 116 in the light path shift device of an embodiment.

FIG. 5 is a front view illustrating an arrangement of the transparent line electrodes 115 and the dielectric layer 116 in the light path shift device of the present embodiment.

As shown in FIG. 5, resistors 117 are provided to connect the transparent line electrodes 115 in series.

Preferably, the transparent line electrodes 115 are formed from ITO, ZnO, or other oxide semiconductor evaporation films or sputtering films. Alternatively, the transparent line electrodes 115 may be formed by applying a material in which particles of the above oxide semiconductor are dispersed.

It is preferable that the thickness of the transparent line electrodes 115 be as small as possible. From the point of view of practical use, for example, the thickness of the transparent line electrodes 115 may be 10 µm.

It is preferable that pitches between the transparent line electrodes 115 be from a few tens µm to a few hundreds µm. Practically, the pitches of the transparent line electrodes 115 are adjusted in connection with the dielectric constant and the thickness of the dielectric layer 116 as described below.

The dielectric layer 116 may be formed from glass, or resins or other transparent materials. Especially, the dielectric layer 116 may be formed from birefringence materials.

It is preferable that the thickness of the dielectric layer 116 be from a few tens µm to a few hundreds µm. But practically, the thickness of the dielectric layer 116 is adjusted in connection with the pitches of the transparent line electrodes 115.

By using a transparent adhesive agent, the dielectric layer 116 is bonded on a surface of a substrate 118, on which the transparent line electrodes 115 are arranged.

If it desired that the dielectric layer 116 be thin, for example, a thick dielectric layer may be bonded first, and then the thick dielectric layer may be polished to the desired thickness. It is preferable that the light transmittance of the adhesive agent be high, and the refractive index of the adhesive agent be relatively large to be close to the refractive index of the material of the transparent line electrodes 115.

In addition, since a liquid crystal alignment film is to be formed on the dielectric layer 116, and a heat treatment is carried out in the process of forming the liquid crystal alignment film, it is required that the dielectric layer 116 have heat resistance up to about 100° C. to 200° C. When the dielectric layer 116 and the liquid crystal alignment film are formed from resins, it is necessary to optimize the solvent for coating the dielectric layer 116 and the liquid crystal alignment film.

With the dielectric layer 116 being bonded to form a substrate, the above-mentioned light path shift elements 103 and 104 are fabricated on the substrate. At this stage, the transparent line electrodes 115 may be arranged so that the transparent line electrodes 115 on the upper substrate and those on the lower substrate are arranged alternately when viewing the structure under fabrication from the top.

Next, the resistors 117 are arranged to electrically connect the transparent line electrodes 115 in series. The resistors 117 may be formed from materials having appropriate resistance values, and can be formed on the transparent line electrodes 115. In order that the resistors 117 work stably without being damaged, and in order to prevent adverse influences on the performance of the liquid crystal layer due to overheating of the resistors, it is preferable that the surface resistance of the material of the resistors 117 be equal to or greater than $1 \times 10^7$ $\Omega/mm^2$. Specifically, the resistors 117 me be chrome oxide, or tin oxide, or antimony oxide, zinc oxide, ATO (tin oxide including antimony), or a coated material in which particles of the above materials are dispersed.

As for the method of fabricating the resistors 117 on the transparent line electrodes 115, for example, the resistors 117 can be fabricated on the transparent line electrodes 115 by evaporation or sputtering. When using coated resistive materials, the resistors 117 can be made by spin-coating, flexogaphic printing, screen printing, or other printing methods, or by using nozzles of inkjet or other spraying methods.

Depending on the methods of fabricating the resistors 117, it may be necessary to mask the portions of the substrate where the resistors 117 are not formed.

The thickness of the resistors 117 on the transparent line electrodes 115 depends on the materials of the resistors 117. Preferably, the thickness of the resistors 117 is from 1 mm to 5 mm.

Instead of forming the resistors 117 on the substrate, for example, a flexible substrate or the like may be used to extend the transparent line electrodes 115 to connect with a resistive material or a resistor array on another substrate of other device. Then, when a voltage is applied on the transparent line electrodes 115 at the two ends, the potentials of the transparent line electrodes 115 are divided by the resistors 117, thus forcefully forming a desired potential gradient in the effective region.

Although an inverted voltage may occur near the edges of the electrodes, since the dielectric layer 116 is formed on the electrodes, the electric field strength in the liquid crystal layer is flattened and uniform. Hence, it is possible to form a uniform horizontal electric field in a wide effective region, and in each sub-region, the operation of the light path shift can be uniform.

According to the present embodiment, the transparent line electrodes 115 are connected in series by resistors 117. When a voltage is applied on the two ends of the transparent line electrodes 115, stepwise potential differences are applied on the transparent line electrodes 115, and thus it is possible to form a uniform horizontal electric field in a wide effective region.

Although the inverted voltage may occur near the edges of the electrodes, since the dielectric layer 116 is formed on the electrodes, the electric field strength in the liquid crystal layer is uniform. Hence, in each sub-region, it is possible to make the operation of the light path shift uniform. As a result, it is possible to obtain uniform shift distances in the light path shift operation.

Third Embodiment

In the present embodiment, a ½ wave plate 121 is provided at a position after the liquid crystal layer corresponding to the electric field application regions so that only the polarization plane of the light emitted with the light path being shifted is rotated 90 degrees among the linearly polarized light paths incident on the light path shift device.

Figure 6:
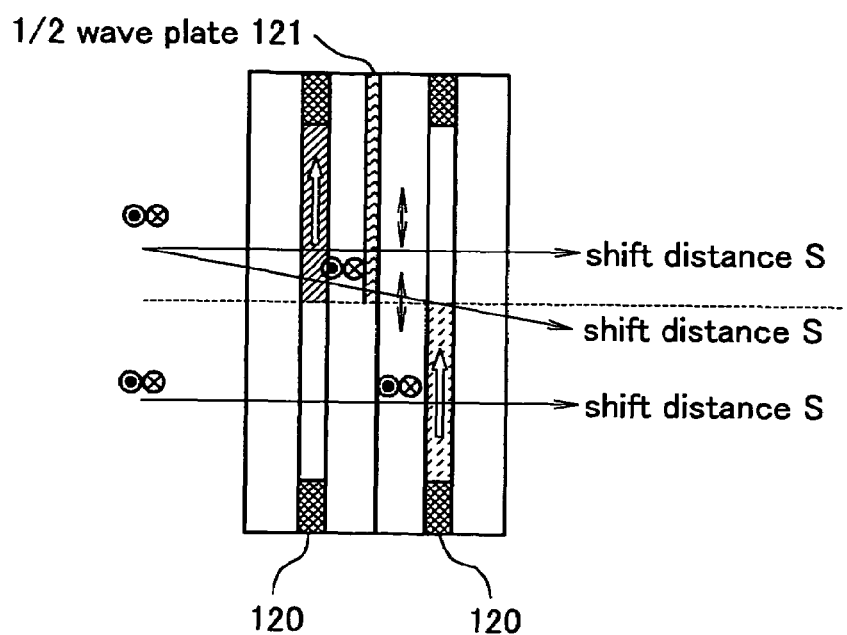
FIG. 6 is a side cross-sectional view illustrating an arrangement of a ½ wave plate between two light path shift elements 120.

FIG. 6 is a side cross-sectional view illustrating an arrangement of a ½ wave plate between two light path shift elements 120.

In FIG. 6, there are two light path shift elements 120. Each of the light path shift elements 120 is configured such that when an electric field is applied in the vertical direction, and linearly polarized light is incident in a direction perpendicular to the paper, the light path can be shifted in the direction perpendicular to the paper.

The linearly polarized light incident on the light path shift elements 120 is shifted by a distance S in an effective region of one of the light path shift element 120 (below, referred to as "the first light path shift element 120") on the left side, and then is emitted. Because of the ½ wave plate 121 arranged between two light path shift elements 120, the polarization plane is rotated 90 degrees in the vertical direction in FIG. 6, and the light is incident on the second light path shift element 120 on the right side. The light incident on the non-effective region of the second light path shift element 120 passes through directly, and the final shift distance becomes S.

Figure 7:
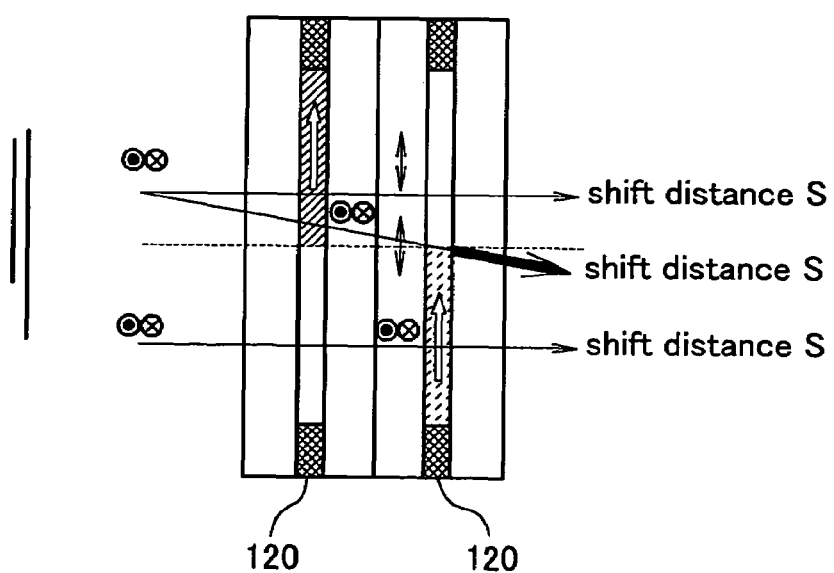
FIG. 7 is a side cross-sectional view illustrating inclined incidence of light in the light path shift device of an embodiment.

FIG. 7 is a side cross-sectional view illustrating inclined incidence of light in the light path shift device of the present embodiment.

As shown in FIG. 7, when the light is incident at an angle, the light shifted by the first light path shift element 120 by a distance S propagates at an angle, and may be incident on the effective region of the second light path shift element 120. Consequently, the final shifted distance is doubled. For this reason, near the boundary, the shifted distances may be different depending on the components of the inclined incident light.

In contrast, as shown in FIG. 6, when the ½ wave plate 121 is provided, after the light passes through the first effective region, the polarization plane of the shifted light is rotated 90 degrees, and thus light path shift does not occur even when the inclined incident light propagates to the effective region of the second light path shift element 120. For this reason, it is possible to obtain uniform shift distances even near the boundary portion. In addition, the ½ wave plate may also be provided at a position after passing through the effective region of the second light path shift element 120.

The ½ wave plate 121 may be formed from a birefringence crystal or a birefringence film. In order to eliminate the differences between the thicknesses and light transmittances of the region including the ½ wave plate 121 and the region without the ½ wave plate 121, the ½ wave plate 121 may be provided to cover the whole region, and it is preferable to set an optical axis direction so that the polarization plane only in a desired region is rotated 90 degrees, and the polarization plane in other regions is not rotated.

When the light is incident at an angle into the light path shift elements 120, the light passing through the effective region of the first light path shift element 120 may enter into the effective region of the downstream second light path shift element 120 in the related art, and the light passing through the effective region twice may have a zero shift distance or a two times shift distance.

In the present embodiment, a ½ wave plate 121 is provided at a downstream position after the light passing through the liquid crystal layer corresponding to the electric field application region of the liquid crystal layer so that a polarization plane of the light, which is shifted in the upstream first light path shift element and is emitted, is rotated 90 degrees. Even when the light with the polarization plane thereof being rotated 90 degrees is incident into the effective region of the downstream light path shift element, light path shift does not occur. This prevents abnormal light path shift.

Fourth Embodiment

Figure 8A:
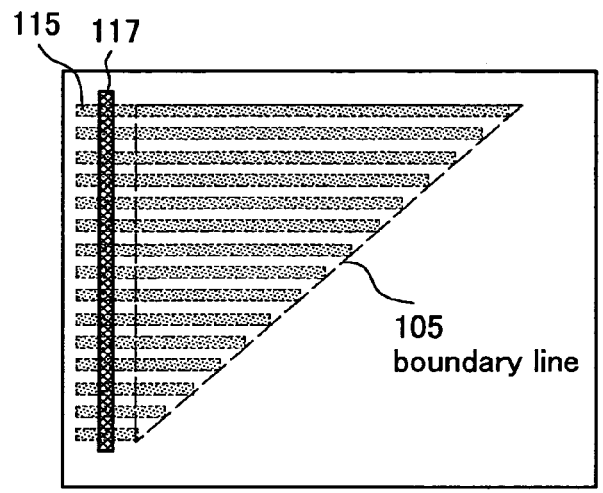
FIG. 8A through FIG. 8C are front views illustrating division of an effective region.
Figure 8B:
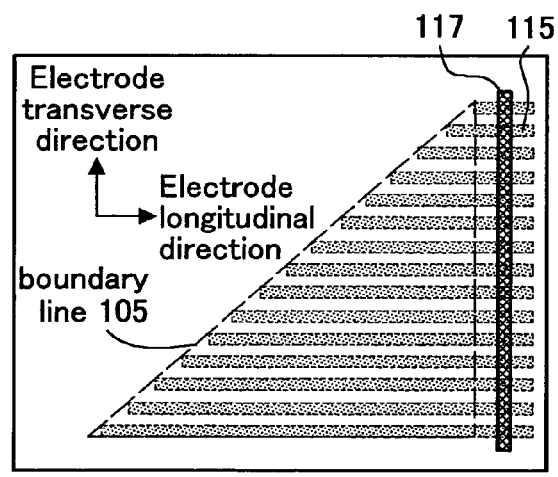

In the present embodiment, as shown in FIG. 8A and FIG. 8B, boundary lines of the divided regions (called as "sub-areas" below) are inclined relative to a longitudinal direction of the transparent line electrodes 115 or a direction perpendicular to the transparent line electrodes 115.

Figure 8C:
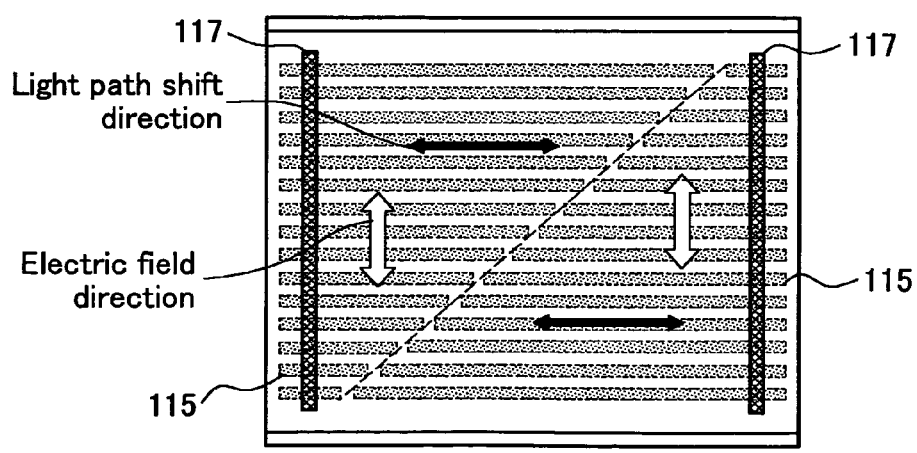

FIG. 8A through FIG. 8C are front views illustrating division of an effective region.

For example, as shown in FIG. 8A through FIG. 8C, one effective region is divided into two sub-areas.

As shown in FIG. 8A and FIG. 8B, triangular light path shift elements are stacked so that that boundary lines 105 are in agreement (please also refer to FIG. 8C).

In such a structure, with the electric field being applied at an angle relative to the boundary line 105, it is possible to set the light path shift direction to be inclined. As a result, it is possible to arbitrarily set the light path shift direction relative to the boundary line 105, allowing arbitrary setting of the light path shift direction relative to the pixel array in the image display device as described below.

According to the present embodiment, the boundary lines of the divided regions are inclined relative to a longitudinal direction of the transparent line electrodes 115 or a direction perpendicular to the transparent line electrodes 115; hence, it is possible to apply the electric field at an angle relative to the boundary line 105, and it is possible to set the light path shift direction to be inclined relative to the boundary line 105.

Fifth Embodiment

Figure 9:
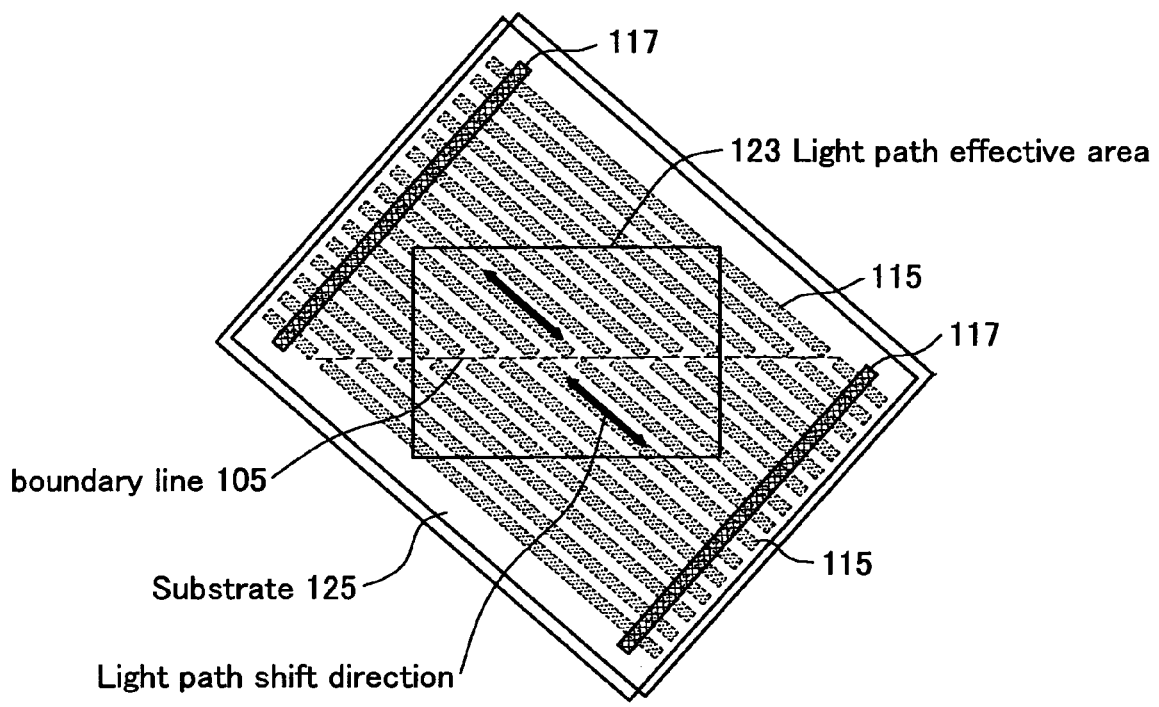
FIG. 9 is a front view illustrating setting a light path shift region.

When using the light path shift device as shown in FIG. 8A through 8C, dividing the quadrangle effective region into an upper part and a lower part, and driving such a light path shift device, the structure as shown in FIG. 9 can be adopted.

FIG. 9 is a front view illustrating setting a light path shift region.

As shown in FIG. 9, the light path shift elements are arranged to be inclined, and one side of the quadrangle effective region is parallel to the boundary line 105.

In this case, however, the area of the light path shift elements is relatively large compared to the area of the effective region of the light path, and this is not preferable in the aspects of the device layout constraints and cost of parts.

Figure 10:
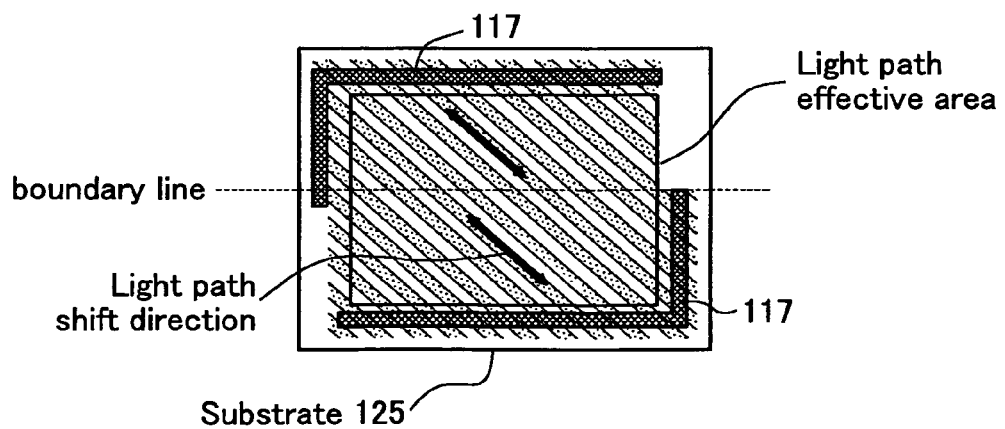
FIG. 10 is a side cross-sectional view illustrating arrangement of the effective region and the resistors according to a fifth embodiment.

FIG. 10 is a side cross-sectional view illustrating arrangement of the effective region and the resistors according to a fifth embodiment.

The effective region 123 of the light path has a quadrangle shape, and the boundary lines of the sub-areas are parallel to one side of the quadrangle substrate.

The transparent line electrodes 115 are arranged to be inclined relative to a substrate 125. When the resistors 117 for connecting the transparent line electrodes 115 are arranged around the substrate 125, as shown in FIG. 10, it is preferable that each of the resistors 117 be L-shaped including a portion along a long side of the substrate 125 and a portion along a short side of the substrate 125. With such a structure, the area of the light path shift elements can be set relatively small compared to the area of the effective region. Thus, it is possible to relatively reduce the size of the substrate relative to the effective region.

Sixth Embodiment

As shown in FIG. 10, when each of the resistors 117 is L-shaped including a portion along a long side of the effective region of the light path shift element and a portion along a short side of the effective region of the light path shift element, the intervals between the transparent line electrodes 115 in the long side are different from the intervals between the transparent line electrodes 115 in the short side. Thus, if the resistors 117 on the two sides have the same materials, the film thicknesses, and widths, the resistance values between the transparent line electrodes 115 on the two sides are different, and the distribution of the electric field strength in the effective region becomes non-uniform.

To solve this problem, in the present embodiment, the width of the portion along the long side and the width of the portion along the short side of the L-shaped resistor 117 are adjusted so that potential drops between every two adjacent transparent line electrodes on the L-shaped resistors are equal.

Figure 11:
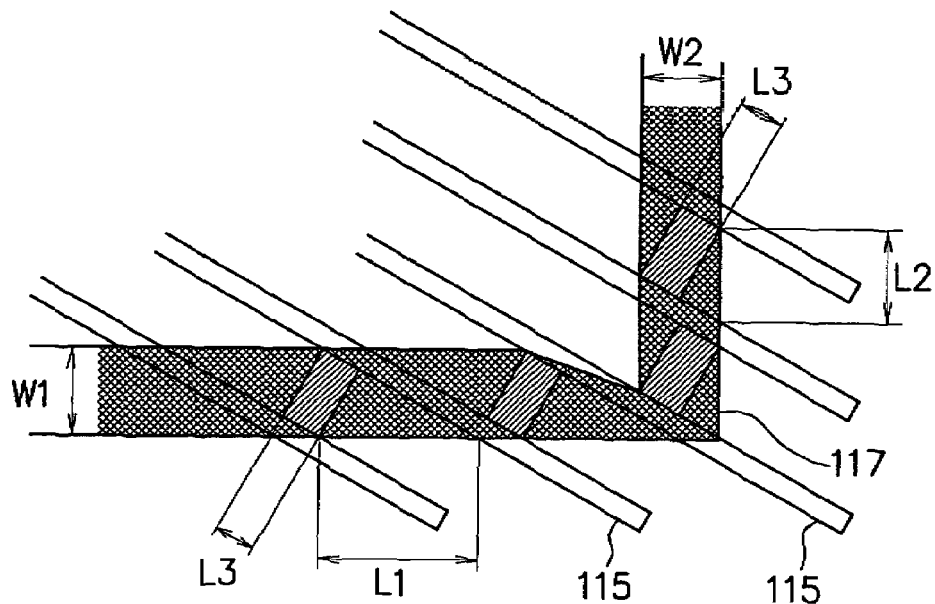
FIG. 11 is an enlarged view illustrating a bending portion of the resistor 117.

FIG. 11 is an enlarged view illustrating a bending portion of the resistor 117.

As shown in FIG. 11, the transparent line electrodes 115 are inclined relative to the sides of the substrate or the sides of the effective region, hence the interval in the horizontal direction is different from the interval in the vertical direction in FIG. 11.

Here, in the effective portion of the resistor 117, namely, in the current path in the resistor 117, the current selectively flows through a portion having the lowest resistance. Because the portion of the resistor 117 corresponding to a shortest distance between two adjacent transparent line electrodes 115 (latched area in FIG. 11) has the lowest resistance, the effective width of the portion of the resistor 117 forming the current path in the resistor 117 is represented by L3. The widths W1, W2 of the resistor 117 are adjusted so that the effective width of the portion of the resistor 117 in the vertical portion and the horizontal portion of the resistor 117 equal L3.

In the above, the widths W1, W2 of the resistor 117 are defined geometrically. Because of existence of contacting resistance between the transparent line electrodes 115 and the resistors 117, it is preferable to experimentally determine the optimum width of the resistors 117.

According to the present embodiment, the widths W1, W2 of the resistor 117 are adjusted so that the resistances between two adjacent transparent line electrodes 115 are equal; thereby, the operation of the light path shift can be uniform inside the effective area.

Seventh Embodiment

In the present embodiment, the boundary line 105 of the sub-regions is inclined 45 degrees relative to the direction perpendicular to the transparent line electrodes 115.

Figure 12:
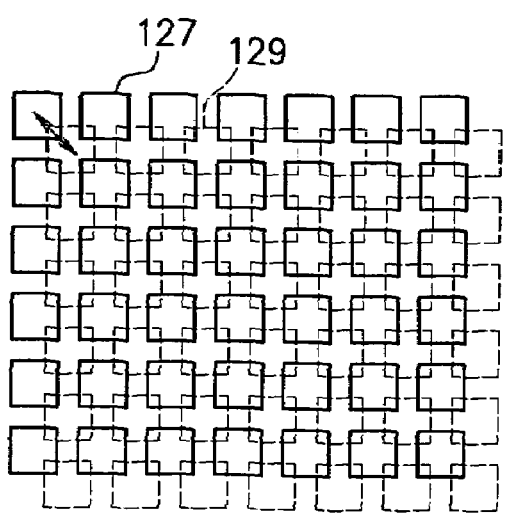
FIG. 12 is a front view illustrating a combination of an image display element and a light path shift element.

FIG. 12 is a front view illustrating a combination of an image display element and a light path shift element.

As shown in FIG. 12, image display device 127 including pixels arranged two-dimensionally with regular pitches are combined with light path devices 129 each for shifting the light path in a 45 degree direction. In this structure, one light path device 129 produces the same shift distance in the vertical direction and in the horizontal direction. That is, in FIG. 12, the pixel positions indicated by solid lines and the pixel positions indicated by dashed lines are combined to display an image having the same number of pixels in the vertical direction and in the horizontal direction.

In addition, similar to FIG. 9, since it is possible to adjust the widths of the L-shaped resistor 117 in the vertical direction and in the horizontal direction to be the same, it is possible to further simplify the structure of the device.

As described above, according to the present embodiment, since the boundary line 105 of the sub-regions is inclined 45 degrees relative to the direction perpendicular to the transparent line electrodes 115, it is possible to use a substrate having a relatively small size. Further, because the imaging light from the image display device 127, which includes pixels arranged two-dimensionally with regular pitches, is shifted 45 degrees, it is possible to produce the same shift distance in the vertical direction and in the horizontal direction.

Eighth Embodiment

Figure 14:
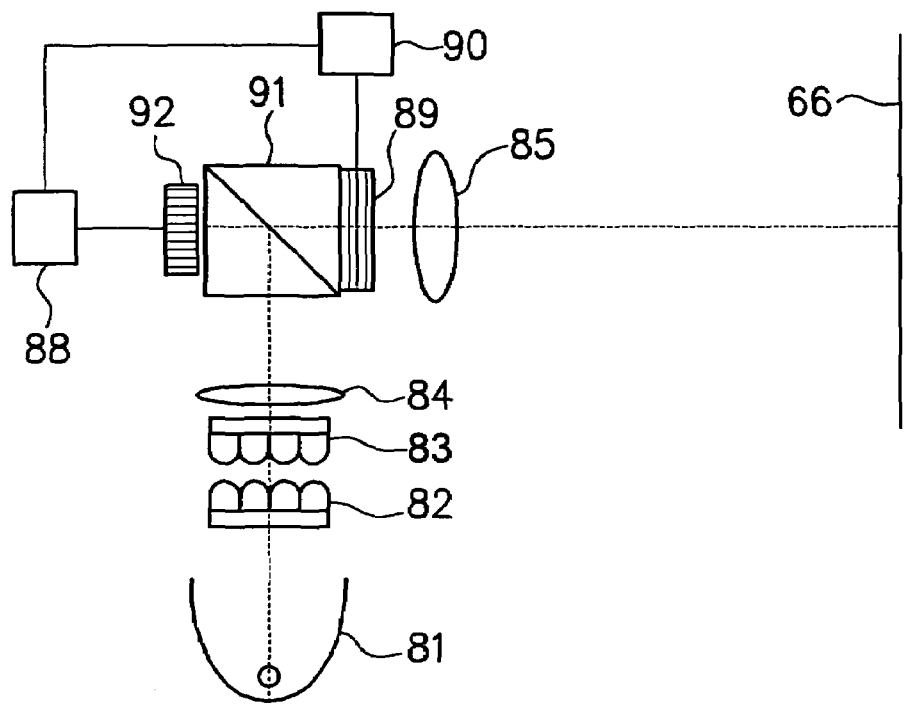
FIG. 14 is a schematic view of a configuration of a magnification display device using a light path shift unit.
Figure 15:
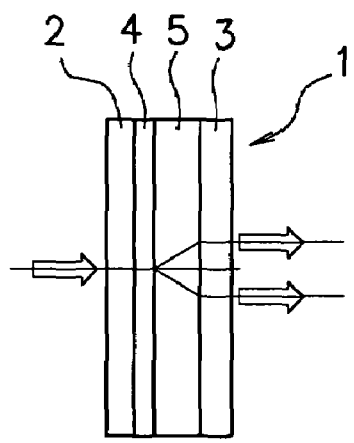
FIG. 15 is a schematic view of a basic configuration of the light path shift unit illustrating light paths of the light path shift unit in the related art.
Figure 16:
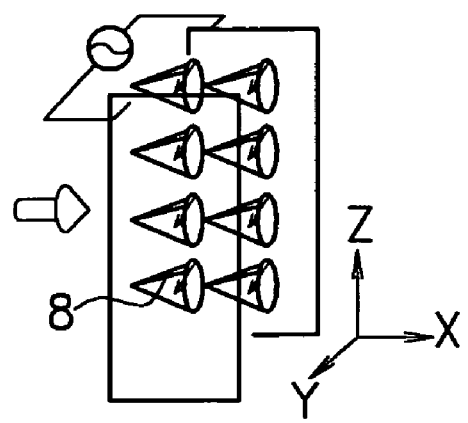
FIG. 16 is a schematic view illustrating the liquid crystal alignment in the light path shift unit in the related art shown in FIG. 15.
Figure 17:
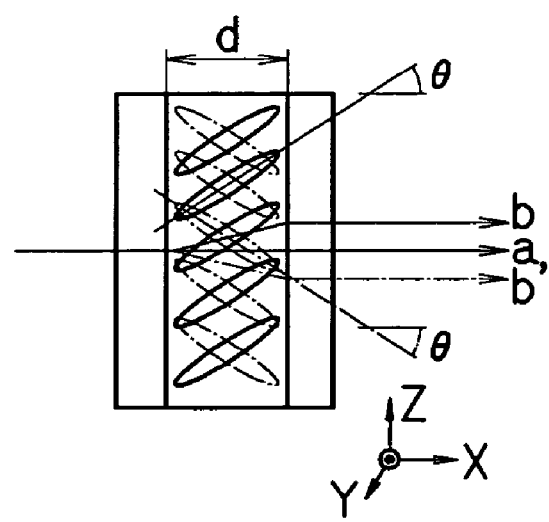
FIG. 17 is a longitudinal sectional view of the portion in FIG. 16 in the related art.
Figure 18:
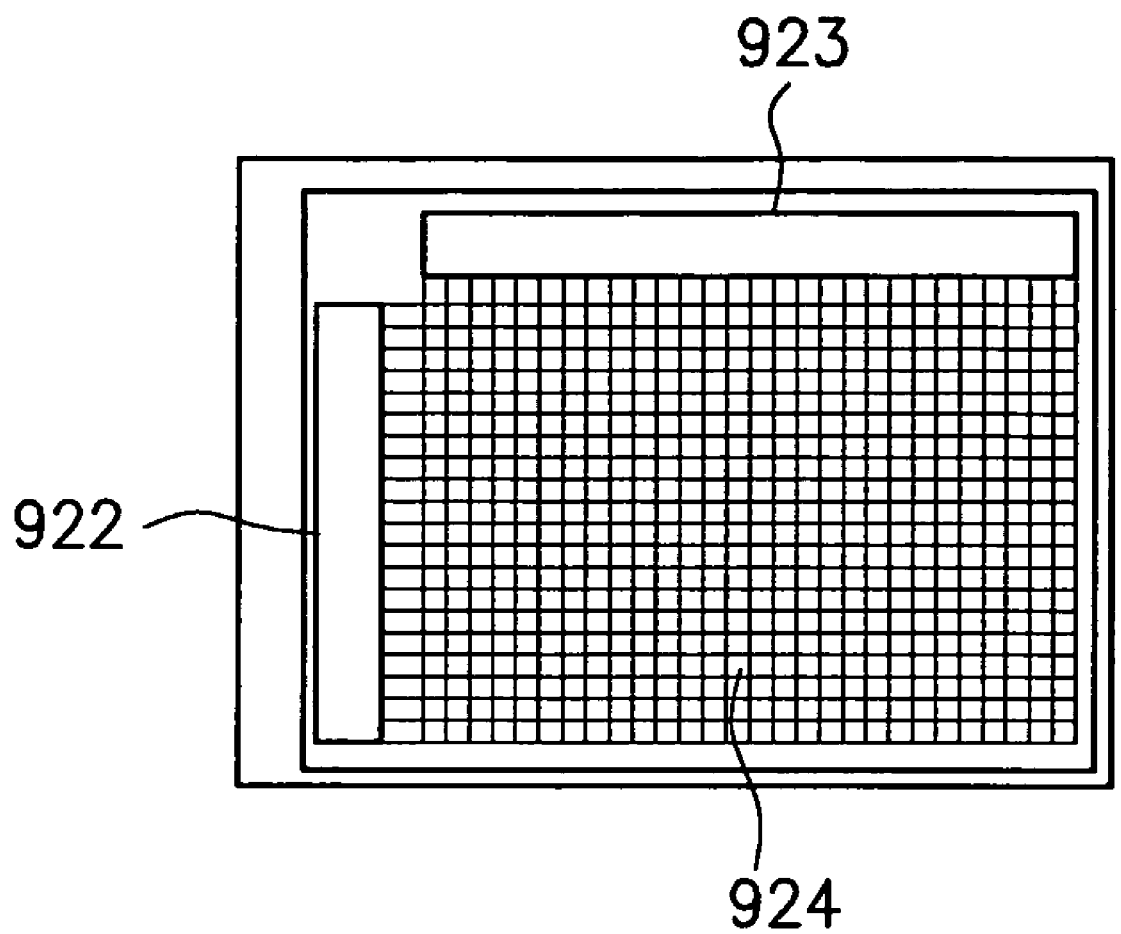
FIG. 18 is a schematic plan view illustrating a liquid crystal panel serving as an image display device in the related art.

In this embodiment, the present invention is applied to the display device as shown in FIG. 14.

Shown in FIG. 14 are a light source 81, a light homogenization system such as a fly-eye lens arrays 82, 83 arranged in the light path from the light source 81 to a screen 66, a condensing lens 84, a not-illustrated polarization filter, a polarized beam splitter 91, a liquid crystal panel 92 serving as an image display device, and a projection lens 85 serving as an optical element for viewing an image pattern.

A light path shift unit 89 is arranged in the light path between the liquid crystal panel 92 and the projection lens 85, which serves as a pixel shift element, and the light path shift unit 89 is connected to driver circuit 90.

Here, the light path shift devices as described in the previous embodiments are used as the light path shift unit 89.

In FIG. 14, the light source 81 emits illumination light. The fly-eye lens arrays 82, 83 are integrator optical systems for homogenizing the light from the light source 81. The light passes through the condensing lens 84 and the polarized beam splitter 91, and is illuminated on the liquid crystal panel 92.

The liquid crystal panel 92 spatially modulates the incident light, and the modulated light is incident into the polarized beam splitter 91 and the light path shift unit 89. The light path shift unit 89 shifts the imaging light by a desired distance. The shifted light is magnified by the projection lens 85, and is projected onto the screen 66.

In FIG. 14, for simplicity of illumination, it is assumed that the light source 81 is a white-light source, and the display device is a black-white display illuminated by white light.

Certainly, the present embodiment is not limited to this. For example, the display device can be a color display operated in a field sequential scheme, which includes a color filter capable of color switching in time order in the illumination light path. Alternatively, the display device can use a color splitting filter to split the illumination light into three primary colors, can have a reflection-type liquid crystal panel for each color, and can combine projected color images with a combining prism and project the combined color image.

In either case, one or more light path shift units can be arranged in the light path between the reflection liquid crystal panel and the projection lens.

Above, it is described that the light path shift unit 89 is arranged in the light path between the polarized beam splitter 91 and the projection lens 85. Further, the light path shift unit 89 may be arranged between the polarized beam splitter 91 and the reflection liquid crystal panel 88. In addition, for high speed of data updating, it is preferable that the reflection liquid crystal panel 88 be a liquid crystal panel on a silicon substrate (LCOS).

The liquid crystal panel may also be a transmitting type liquid crystal panel using a poly-silicon TFT substrate, and the configuration of the optical system is not limited to that shown in the FIG. 14. In addition, the light source may be a light emission diode, and preferably, the display device can be used in applications such as head-mount display, in which the image is magnified for being viewed by bare eyes.

According to the present embodiment, it is possible to shift the pixel positions of the image display device in time order, and switch the displayed image of the image display device according to the shift operation. As a result, it is possible to display high resolution images with an image display device having a small number of pixels.

Ninth Embodiment

In this embodiment, a sequentially scanning display unit is used as an image display device, and the boundary line of divided regions of the light path shift element is nearly perpendicular to the scanning direction of the image display device.

FIG. 13A through FIG. 13E are front views illustrating operations of the image display element and the light path shift element.

Figure 19:
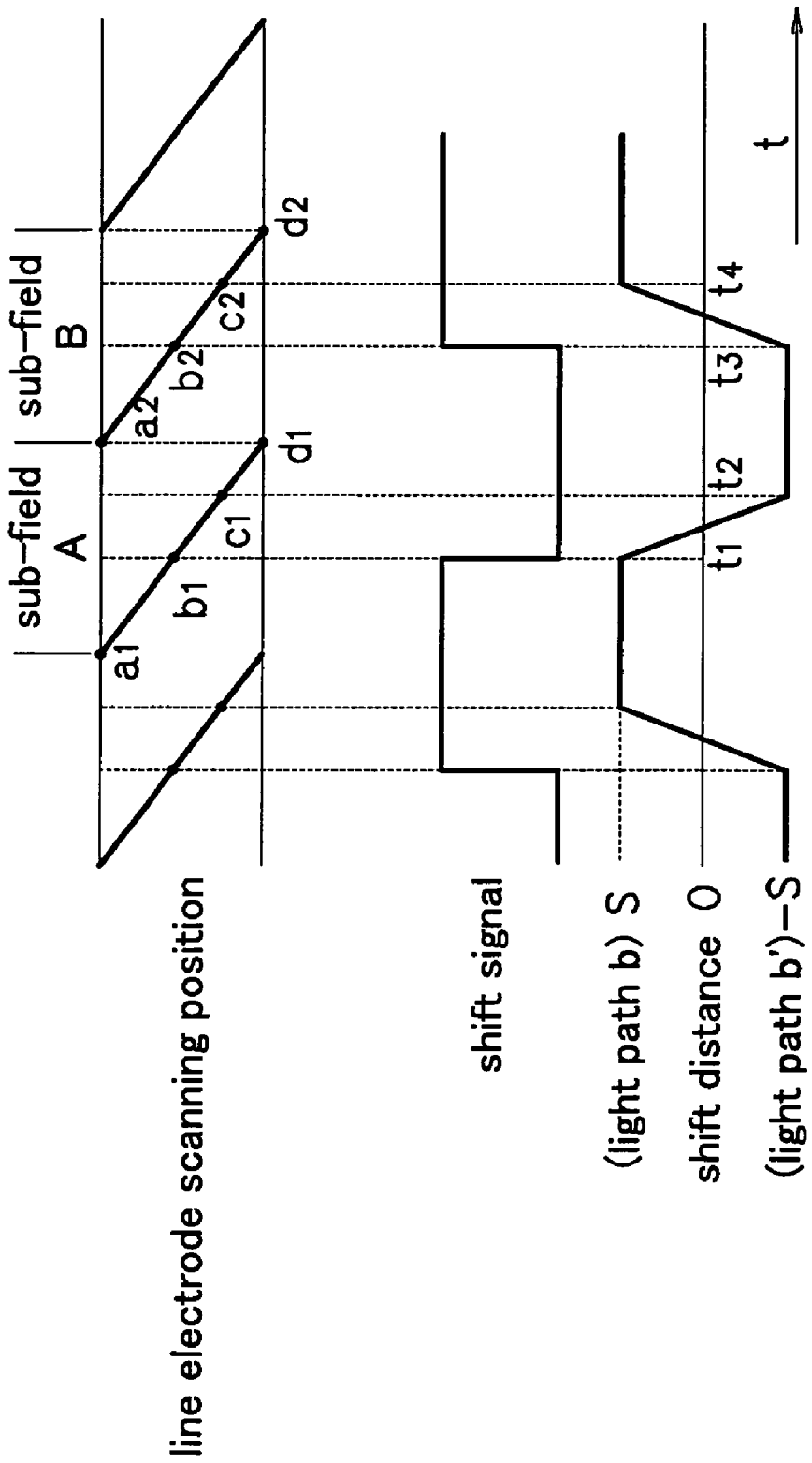
FIG. 19 is a diagram illustrating a relationship between an electrode scanning position and a shift distance in the related art.

The left portions in FIG. 13A through FIG. 13E illustrate the operations of the sequential scanning display unit to change a sub-field image A (SFA) state to a sub-field image B (SFB) state, corresponding to the state from a2 to d2 in FIG. 19.

The right portions in FIG. 13A through FIG. 13E illustrate the light path shift direction of different divided regions in the light path shift element. The boundary line of the divided regions of the light path shift element is perpendicular to the scanning direction (vertical direction in FIG. 13A through FIG. 13E) of the image display device.

In FIG. 13A, the display unit displays the whole sub-field image A, and the light path shift element shifts the light path toward the upper-left direction in both the upper region and the lower region of the light path shift element.

In FIG. 13B, the sub-field image A is changed to the sub-field image B from the upper region of the display unit, while the light path shift element operates in the same way as in FIG. 13A, that is, shifts the light path toward the upper-left direction in both the upper region and the lower region of the light path shift element.

In FIG. 13C, when the upper half of the display unit is changed to the sub-field image B, the light path shift element changes the shift direction in the upper divided region. In this state, the display unit is divided into an upper region and a lower region near the center and displays two sub-field images A and B. The shift directions of the light path shift element are set corresponding to the state of the display unit.

In FIG. 13D, part of the sub-field image A is left in the lower region of the display unit, while, the light path shift element operates in the same way as in FIG. 13C.

In FIG. 13E, the display unit displays the whole sub-field image B, and the light path shift element shifts the light path toward the lower-right direction in both the upper region and the lower region of the light path shift element.

In this way, the area and time while the sub-field image on the display unit and the light path shift direction are in agreement become long, and it is possible to prevent image quality degradation due to disagreement of the shift direction.

According to the present embodiment, during sequential scanning operations, it is possible to change the light path shift direction in the divided regions of the light path shift element; thus, it is possible to prevent the separation of sub-fields problem, which becomes noticeable during one-time light path shift operations. In addition, this technique can be used in an image display unit which has a slow image rewriting time.

Below, specific examples of the present invention are explained.

EXAMPLE 1

As shown in FIG. 5, two hundred and fifty ITO (Indium Tin Oxide) transparent line electrodes are formed in parallel with pitches of 100 μm on a glass substrate which has an area of 60 mm×70 mm and is 1.1 mm in thickness. Each of the transparent line electrode is 10 μm in thickness and 55 mm in length. A thin glass plate having a thickness of 150 μm is bonded on the upper surface of the transparent line electrode by using a ultraviolet curable adhesive agent. The thickness of the adhesive agent is about 10 μm. The thin glass plate has an area of 60 mm×60 mm. A 2-mm-wide line-shaped mask is disposed in close contact with a 10 mm-wide exposed portion of the transparent line electrode, and a CrSiO film having a surface resistance of $1 \times 10^8$ Ω/mm$^2$ is formed by sputtering. Thereby, line-shaped resistors are fabricated.

As shown in the side cross-sectional view of the light path shift element in FIG. 4, the transparent line electrodes are buried in the transparent glass, and the transparent line electrodes are connected in series by the resistive films.

On the surface of the substrate, a perpendicular alignment film is formed, (namely, homeotropic alignment) which has a thickness of 0.06 μm and is formed from polyimide compounds.

The polyimide alignment film is deposited by applying a poly-amic acid solution by spin-coating, and by heat treatment at 180° C. to obtain a polyimide film.

A spacer sheet having a thickness of 50 μm is sandwiched outside the effective region, and substrates of two linearly symmetric electrodes are arranged to face each other, and are bonded so that the transparent line electrodes on the upper and lower substrates within the effective region are in agreement with each other.

With the cell to be heated at about 90° C., a ferroelectric liquid crystal (manufactured by Chisso Company, product name: CS1029) is injected into the space between the substrates by means of the capillary method. After cooling, the cell is sealed by an adhesive agent, thereby forming a light path shift element having a rectangular effective area of about 50 mm×25 mm and including a liquid crystal layer of 50 μm.

The ITO line electrodes at the two ends of the effective area are connected, and a pulse generator and a high voltage amplifier are used to apply a rectangular AC voltage having levels of ±5 kV at 60 Hz. On the incidence side of the light path shift element, an opening mask pattern, in which 12 μm square openings as shown in FIG. 12 are arranged in the vertical and horizontal directions at pitches of 14 μm. From the side of the mask pattern, a collimated linearly polarized light beam from a white color light source is illuminated. The direction of the linearly polarized light is the same as the longitudinal direction of the electrode. With the temperature of the device at 25° C., the light passing through the mask pattern and the light path shift element was observed by using a microscope. It was found that a uniform light path shift distance of 7 μm was obtained in nearly all the effective region. In addition, outside the effective region of the same device, the light path shift distance is zero.

Another identical light path shift element was fabricated, and as shown in FIG. 1A and FIG. 1B, the two light path shift elements are stacked to have the same boundary line, thereby obtaining a square light path shift device having an effective region of 50 mm×50 mm.

After adjusting the phase of the alternating voltage applied on the two light path shift elements so that the two light path shift elements have the same polarities, the same observation as described above was made by using a microscope. The same results of light path shift distance were obtained.

Additionally, after adjusting the phase of the alternating voltage applied on the two light path shift elements to be different by 180 degrees so that the two light path shift elements have different polarities, the same observation as described above was made by using a microscope. The same results of light path shift distance were obtained.

When the light path shift directions in the two divided regions are the same, it is found that the light path shift distance is 7 μm in different effective regions in the horizontal direction. When making the observation in a wide region near the boundary line, it is found that the behaviors of the two light path shift elements in the upper side and lower side are almost the same. However, it is found the light path shift distance is 6 μm in some regions near the boundary line, slightly smaller than other regions. Since the width of the region is only 1 mm, in practical use, this small difference does not have any influence.

When the light path shift directions in the two divided regions are opposite to each other, it is found that the light path shift distance is 7 μm in different effective regions in the horizontal direction, but when making observations in a wide region near the boundary line, it is found that the light path shift directions of the two light path shift elements in the upper side and lower side are opposite to each other. Further, it is found the light path shift distance is zero in some regions near the boundary line. Since the width of this region is only 1 mm, in practical use, this small difference does not have any influence.

Therefore, a light path shift device is obtained having divided effective regions, and these divided effective regions can be driven independently.

In this example, instead of a parallel light beam incident on the light path shift device, illumination light inclined by 14 degrees was used, and the same observation was made. It was found that in some regions the fluctuation of the shift distance increases near the boundary line compared to the parallel light beam incidence, and in some regions, large shift distances were observed. It is predicted that this is due to the incident light being inclined and transmitting through the liquid crystal layer twice.

EXAMPLE 2

A ½ wave film as shown in FIG. 6 is sandwiched between the two light path shift elements as fabricated in example 1. in order that the thickness of the bonding portion and the transmittance of the whole device are the same, in the upper portion of the element, a film is sandwiched with the optical axis inclined 45 degrees relative to the incidence polarization plane, and in the lower portion of the element, a film is sandwiched with the optical axis inclined zero degrees relative to the incidence polarization plane.

The light path shift elements is irradiated with white linearly polarized light at an inclined illumination angle of 14 degrees, and the same uniform light path shift distances were observed.

When the light path shift directions in the two divided regions are the same, the same uniform light path shift distance of 7 μm is observed in different effective regions in the horizontal direction, and the behaviors of the two light path shift elements in the upper side and lower side are almost the same. However, it is found the light path shift distance is slightly smaller (6 μm) in some regions near the boundary line. Since the width of the region is only 1 mm, in practical use, this small difference does not have any influence. It is predicted that this is due to the incident light being inclined and transmitting through the liquid crystal layer twice.

EXAMPLE 3

As shown in FIG. 8, the lengths of the transparent line electrodes range from 55 mm to 8 mm, and a substrate having triangular effective regions is used. The transparent line electrodes are arranged so that the boundary line of the sub-regions is inclined 45 degrees relative to the direction perpendicular to the transparent line electrodes.

In addition, the thickness of the spacer sheet is changed to 70 μm.

In the present example, the same light path shift device is fabricated as that in example 2 except for the above differences. Two such light path shift elements are combined to form a light path shift device as shown in FIG. 14, which has two divided regions.

As shown in FIG. 9, this light path shift device has a square effective region of 38 mm×28 mm, and the same results of the light path shift distance are observed as described above. The incidence polarization plane is inclined 45 degrees, and the illumination angle is 7 degrees.

When the light path shift directions in the two divided regions are the same, the light path shift distance of 10 μm inclined 45 degrees, as shown in FIG. 12, is observed in different effective regions.

When making the observation in a wide region near the boundary line, it is found the behaviors of the two light path shift elements in the upper side and lower side are almost the same. However, it is found the light path shift distance is slightly smaller (9 μm) in some regions near the boundary line, Since the width of this region is only 1 mm, in practical use, this small difference does not have any influence.

When the light path shift directions in the two divided regions are opposite to each other, it is found that the light path shift distance is 10 μm in different effective regions, but when making observation in a wide region near the boundary line, it is found that the light path shift directions of the two light path shift elements in the upper side and lower side are opposite to each other. Further, it is found the light path shift distance is zero in some regions near the boundary line. Since the width of this region is only 1 mm, in practical use, this small difference does not have any influence.

The size of the substrate is relatively large (60 mm×70 mm) with respect to a square effective region of size 38 mm×28 mm.

EXAMPLE 4

A relatively small substrate (52 mm×40 mm) is used, and the transparent line electrodes are inclined 45 degrees. There is no dielectric layer and the resistor is L-shaped.

In the present example, the same light path shift device is fabricated as that in example 3 except for the above differences.

Because the transparent line electrodes are inclined 45 degrees, the intervals between the transparent line electrodes are equal in both the vertical direction and the horizontal direction, and the widths of the vertical portion and the horizontal portion of the resistor are the same. Similarly, the same results of light path shift distance were obtained as in the example 4. Therefore, a light path shift device is obtained which is much more compact but has the same optical characteristics.

EXAMPLE 5

A projection device as shown in FIG. 14 is fabricated by using a reflection-type twisted-nematic liquid crystal display unit, which has 1024×768 pixels, and a response speed of 1 ms. The scanning direction of the display unit is along the short side. In addition, the display unit has a diagonal length of 0.7 inch, and the pixel pitches is 14 µm in the vertical and horizontal direction. The light path shift device in example 5 is used and the longitudinal direction of the transparent line electrode is inclined 45 degrees relative to the scanning direction of the display unit.

Figure 13:
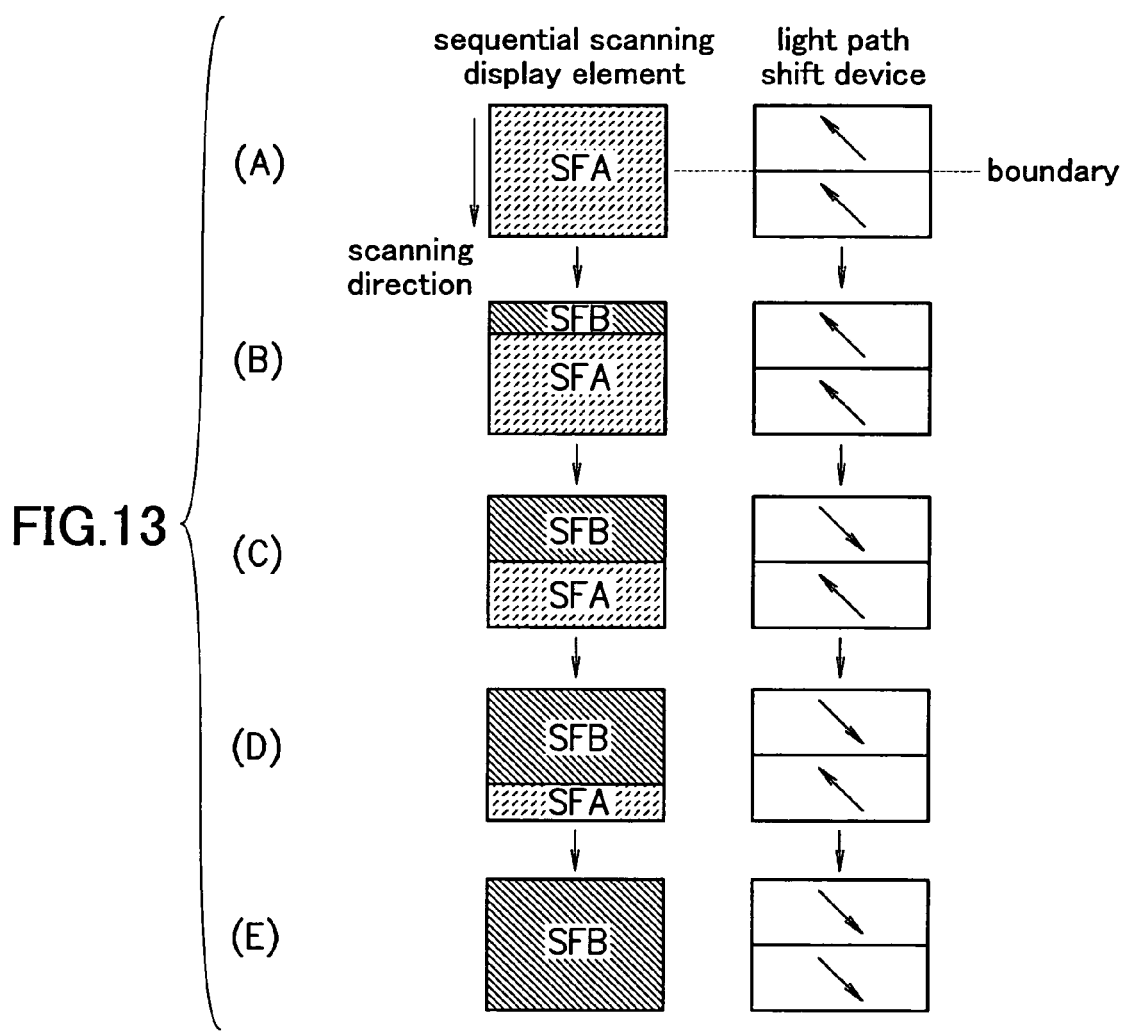
FIG. 13A through FIG. 13E are front views illustrating operations of the image display element and the light path shift element.

The driving circuit of the light path shift device is set such that the shift directions of the light path shift elements in different effective regions are switched according to the image updating timing of the display unit as shown in FIG. 13. The two sub frame image as shown in FIG. 12 are images at positions shifted by a distance equaling half a pixel pitch in a tilt direction at 45 degrees.

Because the light path shift device in the present example is able to shift by 10 µm in a tilt direction at 45 degrees, the pixel intervals are the same in the tilt direction at 45 degrees.

In such a configuration, with 1024×768 pixels, it is possible to display images apparently having a doubled number of pixels. In addition, when updating the image on the display unit, because it is possible to reduce disagreement between a portion of the sub-frame image and the light path shift direction, it is possible to display high resolution images by using the light path shift.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2005-076107 filed on Mar. 16, 2005, the entire contents of which are hereby incorporated by reference.

What is claimed is:

1. A light path shift device, comprising:
  a plurality of light path shift elements including,
    a liquid crystal layer held between at least two opposite, transparent substrates, said liquid crystal layer being homeotropically aligned and operative to form a chiral smectic C phase, and
    a plurality of electrodes providing an electric field in an effective region of the liquid crystal layer in a horizontal direction, the electrodes including,
      a plurality of transparent line electrodes formed on the at least two substrates one parallel to each other, a dielectric layer being formed between a plane of the transparent line electrodes and the liquid crystal layer, the transparent line electrodes being connected in series by a plurality of resistors, each of the resistors having an L-shape corresponding to a long side and a short side of the rectangular effective region of each of the light path shift elements, a longitudinal portion and a lateral portion of each of the L-shaped resistors adjusted so that potential drops between every two adjacent transparent line electrodes on the L-shaped resistors are equal,
  wherein a light path passes through the effective region, and the plurality of light path shift elements are stacked so that adjacent pairs of the effective regions of the plurality of the light path shift elements are separated by a boundary line therebetween when being viewed along the direction of light propagation.

2. The light path shift device as claimed in claim 1, wherein a ½ wave plate is provided at least at a downstream position relative to the liquid crystal layer corresponding to an electric field application region of the liquid crystal layer so that a polarization plane of only light emitted with a light path thereof being shifted is rotated by 90 degrees among linearly polarized light beams incident on each of the light path shift elements.

3. The light path shift device as claimed in claim 1, wherein the boundary lines of the effective regions are inclined relative to a longitudinal direction of the transparent line electrodes or a direction perpendicular to the transparent line electrodes.

4. The light path shift device as claimed in claim 1, wherein the effective region through which the light path passes has a quadrangle shape, and the boundary lines are parallel to one side of a quadrangle substrate.

5. The light path shift device as claimed in claim 4, wherein the boundary lines of the effective regions are inclined 45 degrees relative to the direction perpendicular to the transparent line electrodes.

6. An image display device, comprising:
  an image display unit that includes a plurality of pixels arranged in a two-dimensional manner and operative to control light according to image data;
  a light source that illuminates the image display unit;
  an optical member that is used to view an image pattern displayed on the image display unit; and
  a light path shift device that deflects a light path emitted from the image display unit for each of a plurality of sub fields obtained by dividing an image field in a time division manner, the light path shift device including a plurality of light path shift elements including
    a liquid crystal layer held between at least two opposite, transparent substrates, said liquid crystal layer being homeotropically aligned and operative to form a chiral smectic C phase, and
    a plurality of electrodes providing an electric field in an effective region of the liquid crystal layer in a horizontal direction, the electrodes including, a plurality of transparent line electrodes formed on the at least two substrates one parallel to each other, the transparent line electrodes being connected in series by a plurality of resistors, each of the resistors having an L-shape corresponding to a long side and a short side of the rectangular effective region of each of the light path shift elements, a longitudinal portion and a lateral portion of each of the L-shaped resistors adjusted so that potential drops between every two adjacent transparent line electrodes on the L-shaped resistors are equal, wherein a light path passes through the effective region, and the plurality of the light path shift elements are stacked so that adjacent pairs of the effective regions of the plurality of the light path shift elements are separated by a boundary line therebetween when being viewed along the direction of light propagation.

7. The image display device as claimed in claim 6, wherein the image display unit is a sequential scanning type display unit; and a boundary direction of divided regions of the light path shift device is nearly perpendicular to a scanning direction.

* * * * *